United States Patent [19]

Otsuki et al.

[11] 4,072,536
[45] Feb. 7, 1978

[54] WATER-SOLUBLE COATING COMPOSITIONS AND PROCESS FOR THEIR PREPARATION

[75] Inventors: Yutaka Otsuki, Yokohama; Yoshihiko Araki, Kawasaki; Kazuho Aoyama, Tokyo, all of Japan

[73] Assignee: Nippon Oil Company, Ltd., Tokyo, Japan

[21] Appl. No.: 676,886

[22] Filed: Apr. 14, 1976

[30] Foreign Application Priority Data

Apr. 15, 1975  Japan ................................ 50-44802

[51] Int. Cl.² ............................................. C08L 91/08
[52] U.S. Cl. .................................... 106/252; 106/237; 106/238; 106/243; 106/244; 204/181 R; 260/23.7 A; 260/29.7 N; 260/29.7 H; 260/33.2 R; 260/874; 526/49

[58] Field of Search ....... 260/23.7 A, 22 C, 29.7 NR, 260/29.7 H, 78.4 D, 887, 33.2 R; 106/252, 265, 267, 285, 287; 204/181

[56] References Cited

FOREIGN PATENT DOCUMENTS 1,102,652   2/1968   United Kingdom.

*Primary Examiner*—V. P. Hoke
*Assistant Examiner*—William Parker
*Attorney, Agent, or Firm*—Wenderoth, Lind & Ponack

[57] ABSTRACT

A paint comprising as a film-forming component a resinous substance obtained by reacting maleinized polybutadiene containing an unsaturated group and having a low degree of polymerization with a dialkylaminoalkylamine. The resinous substance can be readily rendered water-soluble, and is useful as aqueous paints, particularly electrodeposition paints that deposit on the cathode. In place of the maleinized polybutadiene, maleinized drying oils or semi-drying oils or maleinized petroleum resins can also be used.

9 Claims, No Drawings

WATER-SOLUBLE COATING COMPOSITIONS AND PROCESS FOR THEIR PREPARATION

This invention relates to a water-soluble curable coating composition, especially a water-soluble curable coating composition suitable for electrodeposition coating of various objects which act as a cathode, and to a process for its production.

Conventional water-soluble paints, especially electrodeposition paints, are based on resins containing an acid group, for example, maleinized oils, maleinized polybutadiene, alkyd resins, or acrylic resins containing acrylic acid or methacrylic acid as a copolymer component, which are rendered water-soluble by neutralization with bases such as ammonia, amines or potassium hydroxide.

The resins dissociate in water and become resins having anions, and therefore, in electrodeposition, precipitate on an object to be coated, which is an anode. Since in such a process a metal to be coated becomes an anode, it undergoes oxidation by oxygen generated as a result of electrolysis of water, and partly dissolves in the aqueous solution. A part of the metal that has dissolved remains in the resulting electrodeposited coating, and colors it. For example, if the object to be coated is made of iron, it results in the coloring of a white paint to brown; and if it is made of aluminum, it results in coloring it yellow. Furthermore, the metallic ion remaining in the coating markedly reduces the corrosion resistance of the coating. The paint solution is also contaminated by the dissolved ion, and the stability of the electrodeposition bath is considerably impaired.

The above dissolving and contamination occur similarly when the metal to be coated has been treated with phosphates for rust-proofness, and the phosphate coating formed is dissolved to reduce the rust-proofing effect drastically. Furthermore, coatings of a paint of this type do not possess sufficient alkali resistance.

If an object to be coated can be used as a cathode in electrodeposition, the dissolving of the metal from the coated article or the dissolving of its surface coating will not occur, and therefore, a coating of good corrosion resistance will be obtained without the coloration of the coating by the dissolved metal ion. In addition, this electrodeposition process is applicable to metals which cannot be satisfactorily coated by the anode-precipitating electrodeposition method because of their tendency to dissolve.

In order to perform an electrodeposition method using a coating object as a cathode, it is necessary to use a water-soluble resin which becomes a cationic resin in water and precipitates on the cathode.

Various investigations have been made as to the method for producing water-soluble resins that will precipitate on the cathode, and resulted, for example, in modified epoxy resins (Japanese Patent Publications Nos. 23807/74 and 31736/74), and modified acrylic resins obtained by radical-copolymerization of acrylic monomers containing a tertiary amino group such as

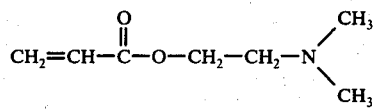

with various acrylic monomers or other monomers (Japanese Patent Publications Nos. 37147/73, 12396/70, 12395/70, and 39351/70).

These conventional electrodeposition paints that will precipitate on the cathode have various defects such as a high curing temperature or low degree of curing, and have not yet gained commercial acceptance.

Coatings of water-soluble paints are required to be cross-linked by some means because they are readily soluble in water. Usually, this is accomplished by baking the coating at 150° to 200° C for about 30 minutes after coating. In order to meet this requirement, the conventional practice has relied, for example, on a method involving mixing or pre-condensing water-soluble paints with a melamine-formaldehyde resin or a phenol-formaldehyde resin, or a method involving modifying them with drying oils. These methods, however, are not applicable to the electrodeposition paint resins that precipitate on the cathode because they do not contain an acid group, and therefore, are not cured sufficiently with the melamineformaldehyde resin or phenol-formaldehyde resin, or the composition of the coating varies.

For use in electrodeposition, any such water-soluble basic resin that can be precipitated on the cathode in electrodeposition must afford a good coating having superior properties; otherwise, they would be low in practical value as electrodeposition resins. Furthermore, paints based on such resins must have sufficient stability not only in low concentrations after dilution or in usual paint concentrations before dilution, but also during storage or running.

It is an object of this invention therefore to provide a curable water-soluble resin which is free from the defects of the conventional resins as mentioned above, has improved curability, and can be readily made water-soluble.

Another object of this invention is to provide a coating composition having high storage stability which can afford a coating having superior resistance to external mechanical force such as impact or bending, and superior chemical resistance such as resistance to alkali, water or solvent.

We made extensive investigations in an attempt to achieve the above objects, and consequently found that cathode-precipitating resins having superior curability and capable of affording coatings of superior properties can be obtained by reacting resins resulting from the introduction of acid groups into high-molecular-weight compounds containing unsaturated groups, such as natural drying oils (e.g., linseed oil or tung oil), or a synthetic polymer containing a carbon-carbon double bond and having a low degree of polymerization (e.g., maleinized liquid polybutadiene), with diamines containing primary and tertiary amino groups.

The above objects can be achieved in accordance with this invention by a coating composition comprising (1) a curable resinous film-forming component capable of being rendered water-soluble or having been rendered water-soluble, said component consisting of an unsaturated organic compound or unsaturated group-containing liquid or solid polymer having a molecular weight of 300 to 30,000 and containing a carbon-carbon double bond in an amount corresponding to an iodine number of 50 to 500, said unsaturated organic compound or unsaturated group-containing liquid or solid polymer having bonded thereto through a carbon-carbon bond organic basic groups capable of being rendered water-soluble, or having been rendered water-soluble, and hydroxyl-containing neutral groups, and (2) an aqueous or organic liquid medium; wherein said organic basic groups are groups of the following formula in aqueous solutions when rendered water-soluble

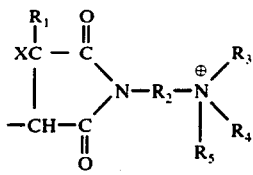  (I)

wherein $R_1$ is a hydrogen atom, a halogen atom or an organic residue containing 1 to 3 carbon atoms; $R_2$, $R_3$ and $R_4$ are identical or different, and represent an organic residue containing 1 to 20 carbon atoms; $R_5$ is a hydrogen atom or an organic residue containing 1 to 20 carbon atoms, and X represents a hydrogen atom or a bond, and are contained in a proportion of 0.05 to 0.5 mole per 100 grams of said film-forming component (1), and said hydroxyl-containing neutral groups are groups of the following formula

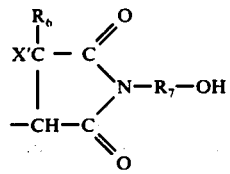  (II)

wherein $R_6$ is a hydrogen atom, a halogen atom or an organic residue containing 1 to 3 carbon atoms; $R_7$ is an organic residue containing 1 to 20 carbon atoms; and X' represents a hydrogen atom or a bond, and are contained in a proportion of 0 to 0.2 mole per 100 grams of said film-forming component (1).

The resin containing a carbon-carbon double bond and groups of formula (I) or groups of formulae (I) and (II), which constitutes the film-forming component of the coating composition of this invention, is a novel high-molecular-weight compound. This compound can be produced by reacting (A) a dicarboxylic acid-modified resinous substance resulting from the bonding through a carbon-carbon bond of acidic groups of the formula

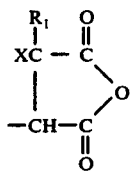  (III)

or

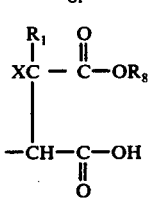  (IV)

wherein $R_1$ is a hydrogen atom, a halogen atom, or an organic residue containing 1 to 3 carbon atoms; $R_8$ is a hydrogen atom or an organic residue containing 1 to 20 carbon atoms; and X represents a hydrogen atom or a bond, to an unsaturated organic compound or unsaturated group-containing liquid or solid polymer having a molecular weight of about 300 to 30,000 and containing a carbon-carbon double bond in an amount corresponding to an iodine number of 50 to 500, with (B) a diamine compound of the formula

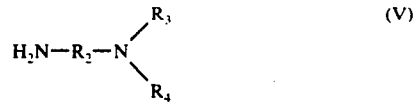  (V)

wherein $R_2$, $R_3$ and $R_4$ are identical or different, and represent an organic residue containing 1 to 20 carbon atoms, or with said diamine compound (B) and (C) an alcohol amine compound of the formula $$H_2N - R_7 - OH \qquad (VI)$$

wherein $R_7$ is an organic residue containing 1 to 20 carbon atoms, thereby to form a resinous substance containing basic groups either alone or together with hydroxyl-containing unsaturated groups; optionally rendering the basic groups water-soluble; and then mixing the resulting resinous product with an aqueous or organic liquid medium; or performing the above reaction in the presence of an aqueous or organic liquid medium.

The dicarboxylic acid-modified resinous substance contains a main chain derived from an unsaturated organic compound or unsaturated group-containing liquid or solid polymer having a number average molecular weight (to be referred to simply as molecular weight) of 300 to 30,000 and containing a carbon-carbon double bond in an amount corresponding to an iodine number of 50 to 500, preferably 100 to 470.

Examples of such an unsaturated organic compound are natural oils and fats such as linseed oil, tung oil, soybean oil or dehydrated castor oil, and stand oils prepared by heat-treating such natural oils and fats to increase their molecular weights. Examples of the unsaturated group-containing liquid or solid polymer are polymers with low degrees of polymerization of conjugated diolefins usually containing 4 to 8 carbon atoms such as butadiene, isoprene or piperylene, copolymers with low degrees of polymerization of two or more of these conjugated dienes, and copolymers with low degrees of polymerization of at least one of these conjugated olefins and a vinyl monomer having an ethylenic unsaturation usually with 2 to 20 carbon atoms, in particular, aliphatic or aromatic vinyl monomers such as isobutylene, diisobutylene, acrylic or methacrylic acid or the esters thereof, allyl alcohol or its esters, styrene, α-methylstyrene, vinyltoluene, or divinylbenzene. These compounds can be used either alone or in admixture of two or more.

These polymers with low degrees of polymerization can be produced by known methods. A typical method comprises the anionic-polymerization of conjugated diolefins containing 4 or 5 carbon atoms either alone, or as mixtures with each other, or with an aromatic vinyl monomer such as styrene, α-methylstyrene, vinyltoluene or divinylbenzene in an amount of not more than 50 mole% at a temperature of 0° to 100° C in the presence of an alkali metal or organic alkali metal compound as a catalyst. In order to control the molecular weight and obtain a light-colored low polymer with a reduced gel content, it is convenient to employ a chain-transfer polymerization method using an organic alkali metal compound such as benzyl sodium as a catalyst and a compound containing an alkylaryl group such as toluene as a chain-transfer agent (U.S. Pat. No. 3,789,090), a living polymerization method carried out in a tetrahydrofuran solvent using a polynuclear aromatic compound such as naphthalene as an activator and an alkali metal such as sodium as a catalyst (Japanese Patent Publications Nos. 17485/67 and 27432/68), and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (Japanese Patent Publications Nos. 7446/57, 1245/58, and 10188/59). Polymers having a low degree of polymerization can also be produced by the coordination anionic polymerization using an acetylacetonate compound of a metal of Group VIII of the periodic table, such as cobalt or nickel, and an alkylaluminum halogenide as catalysts (Japanese Patent Publication Nos. 597/70 and 30300/71).

Furthermore, petroleum resins having an unsaturated group produced by cationic polymerization of petroleum cracking fractions containing 4 to 10 carbon atoms with a Friedel-Crafts catalyst such as aluminum chloride, boron trifluoride or a complex of these at 0 to 100° C, and a butadiene/isobutylene copolymer having a low degree of polymerization and prepared by using a similar catalyst, can also be used as the main chain portion of the resins used in the present invention.

The natural oils and fats exemplified above have a molecular weight of 300 to 30,000, preferably 1,000 to 5,000, and the low polymers of conjugated dienes have a molecular weight of 300 to 30,000, preferably 1,000 to 5,000. If the molecular weight is larger than 30,000, these compounds have poor solubility in water, and if it is less than 300, coatings obtained from these compounds have too low a strength to be practical.

The above natural oils and fats and the conjugated diolefin polymers or copolymers having low degrees of polymerization have an iodine number of 50 to 500, preferably 100 to 470. If the iodine number is less than 50, the curability of these compounds is poor, and if it exceeds 500, they have poor storage stability.

The "iodine number", as referred to in the present application, is measured by the following method disclosed in A. Kemp and H. Peters, Ind. Eng. Chem., Anal., Ed. 15, 453 (1943). About 0.1 g of a sample is collected in a flask for iodine number measurement, and 100 ml of chloroform and 100 g of p-dichlorobenzene are added to dissolve the sample. Then, 60 ml of a 0.1N carbon tetrachloride solution of iodine monochloride is added, and reacted with the sample by shaking at room temperature for 1 hour. Then, 10 ml of a 10% aqueous solution of potassium iodide is added, and the mixture is shaken for 5 minutes. The resulting solution is then titrated with a 0.1N aqueous solution of sodium thiosulfate using starch as an indicator.

The dicarboxylic acid-modified resinous substance used in the present invention can be prepared by introducing into the resinous substance an acid group of the following formula

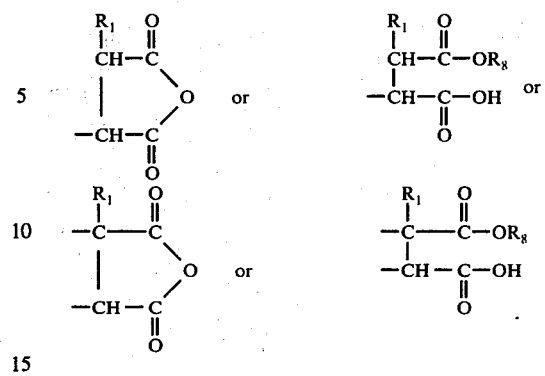

wherein $R_1$ is a hydrogen atom or an organic residue containing 1 to 3 carbon atoms, and $R_8$ is a hydrogen atom or an organic residue containing 1 to 20 carbon atoms.

Introduction of acid groups can be performed by using a conventional method which comprises adding maleic acid, maleic anhydride, citraconic acid or citraconic anhydride, etc. at a temperature of about 100° to 300° C (Japanese Patent Publication No. 11195/71). The acid anhydride groups can then be reacted with water or an alcohol. A method can also be used preferably in which gellation is prevented by causing phenylenediamine, pyrogallol, or naphthol to be present in the reaction system (German OLS No. 2,362,534). It is also possible to mix two or more of the above natural oils and fats or the low polymers or copolymers of conjugated diolefins and then introduce the above acid groups; or to first introduce the acid groups and then mix at least two of such compounds. Where the rate of addition of the acid group greatly differs between these components, it is preferred to introduce the acid group into each of them, and then mix them.

In addition to the above-mentioned methods of introducing acid groups after preparing the main chain portion, the dicarboxylic acid-modified resinous substance (A) used in this invention can also be prepared by a process disclosed in U.S. Pat. No. 2,608,550 which comprises heat polymerizing cyclopentadiene or dicyclopentadiene and maleic anhydride at a temperature of 150 to 300° C.

The amount of the acid groups of the above general formula (III) or (IV) is 0.05 to 0.7 mole, preferably 0.1 to 0.3 mole, per 100 grams of the resin containing the basic group of formula (I) with or without the neutral group of formula (II). When the amount of the acid group is less than 0.05 mole per 100 grams of the resin, neutralization of a resin, which is obtained by reacting the dicarboxylic acid-modified resinous substance with a diamine compound of formula (V), with an acid results in a resin having poor water solubility. If the amount of the acid group is larger than 0.7 mole, the resulting resin has excessive water solubility, and coatings prepared therefrom have poor water resistance.

Examples of the diamine compounds of formula (V) containing a primary amine and a tertiary amine group are dimethylaminoethyl amine, diethylaminoethylamine, dimethylaminopropylamine, diethylaminopropylamine, and dibutylaminopropylamine.

Preferably, the diamine compound is used in an amount equimolar to, or less than, the acid groups of the dicarboxylic acid-modified resin (component A). It is also possible to use an excess of the diamine, and distill the excess after reaction.

In the present invention, an alcohol amine compound of the general formula $H_2N-R_7-OH$ (VI) is preferably used in addition to the diamine compound in order to introduce a hydroxyl group into the dicarboxylic acid-modified resin. Typical examples of the alcohol amine compound are monomethanolamine, monoethanolamine, monopropanolamine, monobutanolamine and monopentanolamine. The adhesiveness and water-solubility of the coating composition are further improved by introducing such a hydroxyl-containing neutral group.

The alcohol amine can be reacted with the dicarboxylic acid-modified resin simultaneously with the reaction of the diamine compound; or they can be reacted with the dicarboxylic acid-modified resin sequentially.

The reaction of the dicarboxylic acid-modified resin (component A) with the diamine compound (component B) with or without the alcohol amine compound (component C) (imidization reaction) is carried out at a temperature of 50 to 300° C, preferably 100° to 200° C. In order to promote the reaction, the water formed may be evaporated from the reaction system. Since this reaction is irreversible, however, it is not particularly necessary to remove the generated water out of the reaction system.

In the manner described above, 0.05 to 0.5 mole, preferably 0.1 to 0.25 mole, of the diamine compound and 0 to 0.2 mole, preferably 0.01 to 0.1 mole, of the alcohol amine compound can be introduced per 100 g of the filmforming component.

The imidization reaction can be carried out either in the presence or absence of a solvent. Where the viscosity of the dicarboxylic acid-modified resin (component A) is low, it is preferred not to use a solvent. Where a solvent is used, it should be a compound which does not induce an undesirable reaction with the acid groups of the dicarboxylic acid-modified resin. Examples of suitable solvents are hydrocarbons such as benzene, xylene or cyclohexane, alcohols such as butyl cellosolve, and ethers such as diglyme. Preferably, however, a hydrophilic solvent such as butyl Cellosolve is used to render it water-soluble directly.

The resulting resin containing a carbon-carbon double bond, a tertiary amino group, and a hydroxyl group is rendered water-soluble preferably by neutralization with 0.2 to 1.0 mole equivalent, based on the tertiary amino group, of a water-soluble acid, for example, an inorganic acid such as hydrochloric acid or sulfuric acid, and an organic acid such as formic acid, acetic acid, or propionic acid. Alternatively, the resin may be treated with a halogenated hydrocarbon such as methyl chloride, ethyl chloride or butyl chloride to yield a quaternary ammonium salt group.

The film-forming component so prepared can be dissolved or dispersed in water or in organic solvents that are usually employed as media for coating compositions. Examples of preferred organic solvents are benzene, toluene, xylene, cyclohexane, tetralin, decalin, and kerosine fractions of mineral oils. Water containing a water-soluble solvent, such as butyl Cellosolve, ethyl Cellosolve, methyl cellosolve, dimethoxyethane, diethylene glycol dimethyl ether, or diacetone alcohol, can also be used.

Dissolving or dispersing of the film-forming component in the above medium can be performed by any conventional mixing means generally employed in the manufacture of paints to mix the film-forming component with the medium, for example, a method comprising mixing them by an ordinary stirrer equipped with stirring vanes.

Where a resin rendered water-soluble is used as the film-forming component, it is desirable to dissolve or disperse it in water. Furthermore, in rendering the above resin water-insoluble, it is preferred to use 10 to 100 g of a water-soluble organic solvent capable of dissolving the resin, such as ethyl Cellosolve, propyl Cellosolve, butyl Cellosolve, ethylene glycol dimethyl ether, diethylene glycol dimethyl ether, diacetone alcohol or 4-methoxy-4-methyl-pentanone-2 for the purpose of facilitating the process, increasing the stability of the aqueous solution, and improving the flowability of the resin and the smoothness of the coating.

The water-soluble solvent directly serves for the above purpose when it is used in the imidization reaction described above.

The imidization product between the components (A) and (B) can be used directly as the film-forming component without rendering it water-soluble. In this case, the basic group of formula (I) can be expressed by the following formula

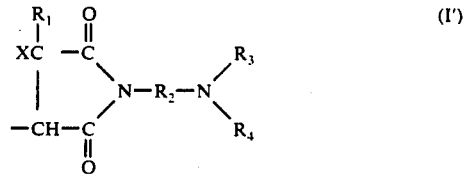

wherein all symbols are the same as defined hereinabove.

Preferably, a coating composition containing the imidization reaction product not rendered water-soluble is used as a solution in an organic solvent, preferably a hydrocarbon solvent.

The amount of the film-forming component of the coating composition of this invention, that is, a product formed by the imidization reaction of the components A and B with or without component C, either as such or after being rendered water-soluble, is not particularly limited. Usually, its amount is such that 0 to 100 parts by weight of the solvent, 0 to 300 parts of various pigments, and 0 to 2000 parts by weight of water are added per 100 parts by weight of this imidization reaction product. When the imidization product is water-soluble, the amount of water is preferably limited to 50 to 1000 parts by weight.

Where the imidization reaction product is directly used without rendering it water-soluble, the coating composition of this invention can contain other known film-forming resins. When it is used as an electrodeposition paint after it has been rendered water-soluble, it can be directly used without adding other resins.

Since a water-soluble paint prepared by adding a suitable pigment such as titania, red iron oxide or carbon black, or a rustproof pigment such as strontium chromate, to an aqueous solution prepared by neutralizing the imidization reaction product with a water-soluble acid is self-curable, it is not likely to cause the non-uniformity of the bath composition which frequently becomes a problem with electrodeposition paints using multi-component resins containing other components for imparting heat curability. Furthermore, since this water-soluble paint precipitates on the cathode in electro-position, it is a very good water-soluble paint for electrodeposition which is free from the coloring of the coating, the unstability of the electrodeposition bath, and the reduced ability to inhibit rust formation.

In the present invention, a dryer such as cobalt naphthenate or manganese naphthenate can be added in order to lower the baking temperature or shorten the curing time.

The water-soluble self-curable resin is accordance with this invention can be utillized also in water-soluble paints applied by ordinary methods such as spraying or immersing, in addition to its utility in electro-deposition.

The following Examples and Comparative Examples further illustrate the present invention in greater detail. The properties of the coatings in these examples were measured in accordance with JIS K-5400.

EXAMPLE 1

A 30-liter autoclave was charged with 1 mole of benzyl sodium, 15 moles of toluene and 15 liters of n-hexane in a stream of nitrogen. The contents of the autoclave were heated to 30° C, and then 10 liters of butadiene was charged at this temperature over the course of 2 hours. Then, 200 ml of methanol was added to stop the polymerization. Then, 1 Kg of clay was added, and the mixture was stirred vigorously. The mixture was filtered to afford a transparent polymer solution containing no alkali. The unreacted butadiene, toluene and n-hexane were distilled off from the polymer solution obtained. Polybutadiene (A) having an iodine number of 430, a 1,2-bond content of 65%, and a number average molecular weight of 1000 was prepared.

A 2-liter autoclave was charged with 1000 g of polybutadiene (A), 150 g of maleic anhydride, 300 g of xylene and 2 g of Antigen 3C (a trademark for a product of Sumitomo Chemical Co., Ltd.), and the mixture was heated at 190° C for 8 hours in a stream of nitrogen. The xylene and unreacted maleic anhydride were distilled off at reduced pressure to afford maleinized liquid polybutadiene (A') having an acid number of 70.

The acid group in the maleinized polybutadiene (A') consisted mainly of

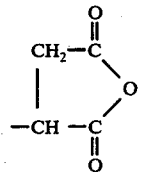

and a minor proportion of

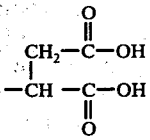

resulting from the hydrolysis with water in the air.

A 2-liter-separable flask was charged with 1000 g of maleinized polybutadiene (A') and 130 g of dimethylaminopropylamine, and the mixture was heated at 130° C for 1 hour. Then, at reduced pressure, the water which was generated and the unreacted dimethylaminopropylamine were distilled off to afford polybutadiene (A'') containing a tertiary amino group and an imide group.

100 g of the resulting polybutadiene (A'') containing a tertiary amino group and an imide group was dissolved in 20 g of diethylene glycol dimethyl ether, a water soluble solvent, and then 30 g of titania, 1 g of carbon black and 1 g of strontium chromate were added. The resulting mixture was treated with 4.6 g of acetic acid to neutralize the polybutadiene, and then dissolved in pure water (deionized water) to prepare an aqueous solution with a solids content of 12% by weight.

The aqueous solution was placed in a 1-liter beaker, and electrodeposition was performed on a mild steel panel (treated with Bondelite #137, a trademark for a product of Nippon Test Panel Co., Ltd.) as a cathode using a carbon electrode plate as an anode under the conditions indicated in Table 1. The test results are shown in Table 1.

COMPARATIVE EXAMPLE 1

100 g of the maleinized polybutadiene (A) synthesized in Example 1 was dissolved in 20 g of diethylene glycol dimethyl ether, and then 30 g of titania, 1 g of carbon black and 1 g of strontium chromate were added. The mixture was treated with an aqueous solution of potassium hydroxide to neutralize the polymer, and then dissolved in pure water to prepare an aqueous solution with a solids concentration of 12% by weight.

The aqueous solution was placed in a 1-liter beaker, and electrodeposition was performed on a mild steel panel (treated with Bondelite #137, a trademark for a product of Nippon Test Panel Co., Ltd.) as an anode using a carbon electrode plate as a cathode under the conditions indicated in Table 1. The test results are shown in Table 1.

A comparison of Example 1 with Comparative Example 1 clearly demonstrates that even when the same starting resin is used, the electrodeposition characteristics of the resulting water-soluble paints and the properties of the resulting coatings differ markedly. According to Example 1 (present invention), the resulting coating is of superior quality with high toughness and markedly improved alkali resistance although with somewhat reduced acid resistance.

Table 1

|  | Example 1 | Comparative Example 1 |
|---|---|---|
| Coating conditions | | |
| Voltage (V) | 50 | 310 |
| Time (minutes) | 3 | 3 |
| Baking conditions | | |
| Temperature (° C) | 190 | 160 |
| Time (minutes) | 3 | 3 |
| Coating thickness (microns) | 20 | 20 |
| Physical tests | | |
| Pencil hardness | H - 2H | 2H - 3H |
| Sketching | Good | Good |
| Crosscut test (tape test) | 100/100 | 90/100 |
| Erichsen (mm) (*1) | >9 | 4.5 |
| Impact strength (cm) (500g, ½B) | | |
| Top surface | >50 | 20 |
| Back surface | >50 | 10 |
| Flexural resistance (mm) (*2) | <2 | 6 |
| Chemical tests | | |
| Alkali resistance (hr) (*3) | >100 | 3.5 |
| Acid resistance (hr) (*4) | 72 | >100 |
| Water resistance (days) (*5) | >30 | >30 |
| Solvent resistance (days) (*6) | >30 | >30 |

Table 1-continued

| | Example 1 | Comparative Example 1 |
|---|---|---|
| Corrosion resistance (mm) (*7) | <1 | 8 |

(*1) The maximum diameter of the extruded portion attained before the breakage of the coating.
(*2) The minimum bending radius which causes cracks to the coating.
(*3) The time that elapses until a change, such as blistering, occurs in the coating (when immersed in 5% NaOH).
(*4) The time that elapses until a change, such as blistering, occurs in the coating (when immersed in 5% H$_2$SO$_4$).
(*5) The time that elapses until a change, such as blistering, occurs in the coating (when immersed in pure water at 40° C).
(*6) The time that elapses until a change, such as blistering, occurs in the coating (when immersed in a 1/1 mixture of toluene and xylene).
(*7) The maximum rust width from cut portion provided in the coating (spray of a 5% aqueous solution of NaCl, 300 hours).

EXAMPLE 2

A 2-liter autoclave was charged with 1000 g of linseed oil having an iodine number of 180 and a molecular weight of about 800, 215 g of maleic anhydride and 50 g of xylene, and the mixture was heated at 190° C for 8 hours in a stream of nitrogen. The unreacted maleic anhydride and the xylene were distilled off at reduced pressure to afford maleinized linseed oil having an acid number of 100 and a viscosity at 25° C of 45 poises. A 2-liter separable flask was charged with 700 g of the maleinized linseed oil and 130 g of dimethylaminopropylamine. The mixture was stirred at room temperature for 1 hour, and then heated at 130° C at reduced pressure for 1 hour to afford linseed oil containing an imide group and a tertiary amino group. 400 g of the linseed oil was dissolved in 60 g of diethylene glycol dimethyl ether, and neutralized with 22.5 g of acetic acid to afford an aqueous solution having a solids concentration of 30%. The aqueous solution was stable with no change in viscosity, transparency and pH after it had been stored for 3 months.

600 g of the 30% aqueous solution obtained, 750 g of titania, 24 g of carbon black, and 24 g of strontium chromate were placed in a 2-liter stainless beaker, and stirred vigorously for 2 hours by a high-speed rotary mixer containing glass beads. Then, the glass beads were removed by filtration, and a pigment paste (A) having very good water dispersibility was obtained.

EXAMPLE 3

A 35-liter stainless steel autoclave equipped with a stirrer was purged with nitrogen, and then charged with 8.1 Kg of butadiene, 16 liters of toluene, 152 g of dioxane and 200 g of a dispersion of sodium. The mixture was heated at 80° C for 2 hours. The catalyst was destroyed with water, and then the reaction mixture was neutralized with hydrochloric acid. The resulting product was washed with water to remove the generated NaCl from it. The toluene was distilled off at reduced pressure to afford a butadiene polymer (B) in a yield of 86% based on the butadiene charged. The resulting butadiene (B') had a number average molecular weight of 820, an iodine number of 420, a vinyl group content of 55%, a trans group content of 17%, a cis group content of 15%, and a viscosity at 25° C of 7 poises.

A 6-liter autoclave was charged with 2 Kg of the polybutadiene (B), 2 Kg of xylene and 200 g of maleic anhydride, and the mixture was heated at 200° C for 5 hours. The xylene and unreacted maleic anhydride were distilled off at reduced pressure to afford maleinized polybutadiene (B') having an acid number of 50.

Then, 100 g of the maleinized polybutadiene (B') and 16.6 g of dibutylaminopropylamine were placed in a 2-liter separable flask equipped with a reflux condenser, and stirred at 130° C for 2 hours. The resulting imidization product was dissolved in 20 g of butyl cellosolve and an aqueous solution of acetic acid to form a 20% aqueous solution of the imidization product. Then, 63.1 g of the pigment paste (A) produced in Example 2 was well admixed with it, followed by addition of pure water to form an electrodeposition coating solution having a solids concentration of 12%.

This electrodeposition coating solution was placed in a 1-liter beaker made of polypropylene, and coated on a copper plate (a test panel with a length of 150 mm, a width of 50 mm and a thickness of 2 mm) as a cathode using a carbon electrode as an anode while applying a direct current voltage of 50 V for 2 minutes. The resulting coating was baked at 200° C for 30 minutes. It was very pliable and had a very superior surface luster. No change occurred in this coating when it was immersed in water at 40° C for 40 days. This coated panel is expected to be a very supeior insulating material in view also of the superior electrical characteristics of the polybutadiene.

EXAMPLE 4

A 20-liter autoclave was charged with 1.0 mole of benzyl sodium, 30 moles of toluene and 15 liter of benzene of a stream of nitrogen. The temperature of the contents was raised at 30° C, and 10 liters of butadiene was placed in the autoclave at this temperature over the course of 4 hours. Then, the catalyst was decomposed with water, and the catalyst residue was removed by washing with water. Then, the toluene, benzene and unreacted butadiene were distilled off to afford polybutadiene (C) having an iodine number of 400, a 1,2-bond content of 51% and a number average molecular weight of 680 (C).

Then, a 2-liter autoclave was charged with 1000 g of polybutadiene (C), 165 g of maleic anhydride, 300 g of xylene and 2 g of Antigen 3C, and the mixture was heated at 190° C for 8 hours in a stream of nitrogen. Then, the xylene and unreacted maleic acid were distilled off at reduced pressure to afford maleinized polybutadiene (C') having an acid number of 80 and a viscosity at 25° C of 1,200 poises.

A 2-liter separable flask equipped with a reflux condenser was charged with 100 g of maleinized polybutadiene (C'), 16.6 g of diethylaminoethylamine, and 20 g of diethylene glycol diemthyl ether, and the mixture was heated at 130° C for 2 hours to afford polybutadiene (C") containing a tertiary amino group and an imide group. The polybutadiene (C") was neutralized and diluted with an aqueous solution of acetic acid, and then, 80 g of titania was incorporated to form an aqueous paint having a solids content of 45%. This paint was of very low viscosity. The resulting water-soluble paint was coated on a polished mild steel panel (#280) using a 5-mil applicator, and baked at 190° C for 30 minutes. The coating obtained had a thickness of 20 microns. This coating was very hard as seen from its pencil hardness of H. It was however very pliable and though as demonstrated by the fact that its Erichsen value was 7 mm and passed a Du Pont impact test (50 cm).

The viscosity of the above paint as aqueous solution was as low as bout 80 KU, and it was found to have very good properties as water-soluble baking paints.

EXAMPLE 5

Polybutadiene (D) having an iodine number of 450, a 1,2-bond content of 65% and a number average molecular weight of 2000 was prepared in the same way as in Example 4 except that the amount of toluene was changed to 5 moles. Furthermore, maleinized polybutadiene (D') having an acid number of 60 and a viscosity for 3,800 poises was prepared in the same way as in Example 4 except that only maleic anhydride was changed to 120 g.

A 2-liter separable flask equipped with a reflux condenser was charged with 100 g of the maleinized polybutadine (D'), 10.9 g of dimethylaminopropylamine, and 20 g of diethylene glycol dimethyl ether, and the mixture was heated at 130° C for 2 hours to afford polybutadiene (D") containing a tertiary amino group and an imide group. The polybutadiene (D") was then dissolved in an aqueous solution of acetic acid to form a 20% aqueous solution of the polybutadiene (D"). The aqueous solution was well admixed with 63.1 g of the pigment paste (A) produced in Example 2, and then pure water was added to form an electrodeposition coating solution having a solids concentration of 12%.

The electrodeposition coating solution was placed in a 1-liter beaker, and precipitated on a mild steel plate (treated with Bondelite 137, a trademark for a product of Nippon Test Panel Co., Ltd.) as a cathode using a carbon electrode plate as an anode. The test results are shown in Table 2.

EXAMPLE 6

An electrodeposition coating solution was prepared in the same way as in Example 5 except that polybutadiene B-1000 having a 1,2-bond content of 90% and a number average molecular weight of 1000 (a product of Nihon Soda Kabushiki Kaisha) was used as the polybutadiene. The same cathode-precipitating electrodeposition coating as in Example 5 was performed. The test results are shown in Table 2.

EXAMPLE 7

An electrodeposition coating solution was prepared in the same way as in Example 5 except that polyoil Hüls 110 (trademark for polybutadiene having a cis-1,4 bond content of about 80% and a trnas-1,4-bond content of about 20% and a number average molecular weight of 1700 made by Hüls Company) was used as the polybutadiene, and the acid number of the maleinized polybutadiene was changed to 80. The same cathode-precipitating electrodeposition coating as in Example 5 was performed. The test results are shown in Table 2.

EXAMPLE 8

Linseed oil was heated at 280° C for 8 hours in a stream of nitrogen to prepare heat-treated linseed oil having a viscosity of 10 poises and an iodine number of about 110.

The, a 2-liter autoclave was charged with 100 g of the heat-treated linseed oil, 120 g of maleic anhydride and 300 g of xylene, and the mixture was heated at 190° C for 6 hours. Then, 500 g of the maleinized linseed oil and 55 g of dimethylaminopropylamine were charged into a 1-liter separable flask, and well mixed at room temperature for 1 hours, followed by heating at 130° C under reduced pressure for 1 hour to afford linseed oil containing a tertiary amino group and an imide group.

Polybutadiene having an iodine number of 460, a 1,2-bond content of 80% and a number average molecular weight of 3600 was prepared in the same way as in Example 4 except that the amount of toluene was changed to 2 moles. Then, the polybutadiene was maleinized in the same way as in Example 4 to afford maleinized polybutadiene having an acid number of 60. Further, in the same way as in Example 5, polybutadiene having a tertiary amino group and an imide group was prepared.

50 g of the linseed oil containing a tertiary amino group and an imide group and 50 g of the polybutadiene containing a tertiary amino group and an imide group were dissolved in 20 g of diethylene glycol dimethyl ether. The solution was well mixed, and dissolved in an aqueous solution of acetic acid to afford a 20% aqueous solution. Then, 63.1 g of the pigment paste (A) prepared in Example 2 was well admixed with the aqueous solution, and pure water was added to form an electrodeposition coating solution having a solids concentrations of 12%.

The same cathode-precipitating electrodeposition as in Example 5 was performed. The test results are shown in Table 2.

Table 2

| Example | 5 | 6 | 7 | 8 |
|---|---|---|---|---|
| Coating conditions | | | | |
| Voltage (V) | 125 | 45 | 50 | 80 |
| Time (minutes) | 3 | 3 | 3 | 3 |
| Baking conditions (° C × min.) | 190 × 30 | 190 × 3 | 190 × 30 | 190 × 30 |
| Coating thickness (microns) | 20 | 20 | 20 | 20 |
| Physical tests | | | | |
| Pencil hardness | H – 2H | B – F | 3B – 2B | 4B – 3B |
| Sketching | Good | Good | Good | Good |
| Crosscut test (tape test) | 100/100 | 99/100 | 98/100 | 98/100 |
| Erichsen (mm) | >9 | >9 | >9 | >9 |
| Impact strength (cm) | | | | |
| Top surface | >50 | >50 | >50 | >50 |
| Back surface | >50 | >50 | >50 | >50 |
| Flexural resistance (mm) | <2 | <2 | <2 | <2 |
| Chemical tests | | | | |
| Alkali resistance (hr) | >100 | 25 | 10 | 5 |
| Acid resistance (hr) | >100 | 40 | 30 | 6 |
| Solvent resistance (days) | >30 | >30 | >30 | 20 |
| Water resistance (days) | >30 | >30 | >30 | 15 |
| Corrosion resistance (mm) | 1 | 3 | 4 | 4 |

EXAMPLE 9

A cracking fraction having a boiling point of 20° to 80° resulting as a by-product from the steam cracking of naphtha was heated at 100° C for 4 hours to demerize a major portion of the cyclopentadiene contained to dicyclopentadiene, and then re-distilled to obtain a fraction having a boiling point of 20° to 80° C and a fraction having a boiling point of 140° to 220° C. A mixture of 75% by weight of the fraction boiling at 20° to 80° C and 25% by weight of the fraction boiling at 140° to 220° C (which was found by a gas-chromatographic analysis to contain 45.0% by weight of all the unsaturated components, 26.5% by weight of a conjugated diolefin and 11.2% by weight of an unsaturated aromatic) was polymerized at 30° C for 5 hours after adding dropwise 0.7% by weight, based on the starting mixture, of a boron trifluoride/phenol complex as a catalyst. The catalyst was decomposed with an aqueous solution of sodium hydroxide. The product was washed with water, and ditilled to afford a petroleum resin having an iodine number of 115 and a softening point of 30° C in a yield of 38% by weight based on the petroleum resin.

13 Parts by weight of maleic anhydride was added to 100 parts by weight of the resulting petroleum resin, and the mixture was stirred at 180° C for 10 hours to perform an addition reaction. Maleinized petroleum resin having an acid number of 64 was obtained.

10 Parts by weight of dimethylaminoethylamine was added to 100 parts of the maleinized petroleum resin, and a petroleum resin containing a tertiary amino group and an imide group was prepared in the same way as in Example 4.

20 g of the petroleum resin containing a tertiary amino group and an imide group and 80 g of the polybutadiene containing a tertiary amino group and an imide group as prepared in Example 5 were dissolved in 20 g of ethylene glycol dimethyl ether, and neutralized with acetic acid to afford a clear electrodeposition coating solution having a solids concentration of 12% by weight.

This electrodeposition coating solution was coated on a test panel (treated with Bondelite #137) as a cathode while applying a voltage of 50 V for 3 minutes. The coating was then baked at 190° C for 30 minutes to afford a smooth clear coating without "sagging". This coating had good adhesiveness and was very hard with a pencil hardness of 2H. It also had superior properties as represented by its Erichsen value of 7 mm and an impact strength of 50 cm.

EXAMPLE 10

A 30-liter autoclave was charged with 1 mole of benzyl sodium, 4 moles of toluene and 15 liters of n-hexane in a stream of nitrogen. The temperature of the contents was raised to 30° C, and then 10 liters of butadiene was added at this temperature over the course of 2 hours. 200 ml. of methanol was added to stop the polymerization. Then, 1 Kg of clay was added, and the mixture was vigorously stirred and filtered to afford a transparent polymer solution containing no alkali. The toluene, hexane and unreacted butadiene were distilled off from the polymer solution to form polybutadiene (A) having an iodine number of 450, a 1,2-bond content of 68%, and a number average molecular weight of 2000.

A 2-liter autoclave was charged with 1000 g of polybutadiene, 150 g of maleic anhydride, 300 g of xylene, and 2 g of Antigen 3C (a trademark for a product of Sumitomo Chemical Co., Ltd.), and the mixture was heated at 190° C for 8 hours in a stream of nitrogen, The unreacted maleic anhydride and the xylene were distilled off at reduced pressure to afford maleinized liquid polybutadiene (A₁') having an acid number of 70.

The acid group in the maleinized polybutadiene (A₁') consisted mainly of

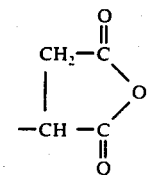

but partly contained

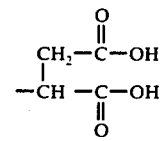

resulting from the hydrolysis with water in the air.

A 2-liter separable flask was charged with 1000 g of the maleinized polybutadiene (A₁'), 200 g of butyl cellosolve, 91.3 g of dimethylaminopropylamine and 21.8 g of monoethanolamine, and the mixture was heated at 140° C for 5 hours to afford a butyl cellsolve solution of polybutadiene (A₁") containing tertiary amino group and a hydroxyl group. The solution had a solids concentration of 83.0% by weight.

2.5 g of acetic acid was added to 120.5 g of the above solution, and the mixture was well stirred, followed by addition of pure water to afford an aqueous solution having a solids concentration of 20% by weight. This solution was clear, of low viscosity, and stable.

Then, 26.3 g of titania, 0.5 g of carbon black and 6.5 g of aluminum silicate were added to the resulting aqueous solution, and they were sufficiently mixed by a homomixer. Pure water was added to form an electrodeposition coating solution having a solids concentration of 12% by weight.

The electrodepostion coating solution was placed in 1-liter beaker, and coated on a mild steel plate (treated with Bondelite #137, a trademark for a product of Nippon Test Panel Co., Ltd.) as a cathode using a carbon electrode plate as an anode. The test results are shown in Table 3.

Table 3

| Coating conditions | |
|---|---|
| Voltage (V) | 120 |
| Time (minutes) | 3 |
| Baking conditions | |
| Temperature (° C) | 200 |
| Time (minutes) | 3 |
| Coating thickness (microns) | 20 |
| Physical tests | |
| Pencil hardness | H - 2H |
| Sketching | Good |
| Crosscut test (tape test) | 100/100 |
| Erichsen (mm) | >9 |
| Impact strength (cm) | |
| Top surface | >50 |
| Back surface | >50 |
| Flexural resistance (mm) | <2 |
| Chemical tests | |
| Alkali resistance (hours) | >150 |
| Acid resistance (hours) | 72 |
| Water resistance (days) | >30 |

Table 3-continued

| | |
|---|---|
| Solvent resistance (days) | >30 |
| Corrosion resistance (mm) | <1 |

The results shown in Table 3 demonstrate that when the starting resin contained a hydroxyl-containing neutral group in addition to a basic group, the electro-deposition characteristics of the resulting paint and the properties of the resulting coating were further improved. The coating obtained had very good adhesion to the object coated, and superior corrosion resistance.

EXAMPLE 11

A 20-liter autoclave was charged with 1.0 mole of benzyl sodium, 10 moles of toluene and 15 liters of benzene in a stream of nitrogen. The temperature was raised to 30° C, and butadiene was added at this temperature over the course of 4 hours. The catalyst was decomposed with water, and the product was washed with water to remove the catalyst residue. The toluene, benzene and unreacted butadiene were distilled off to afford polybutadiene ($B_1$) having an iodine number of 420, a 1,2-bond content of 58% and a number average molecular weight of 1000.

A 2-liter autoclave was charged with 1000 g of the polybutadiene ($B_1$), 165 g of maleic anhydride, 300 g of xyleve and 2 g of Antigen 3C, and the mixture was heated at 190° C for 8 hours in a stream of nitrogen. The xylene and unreacted maleic anhydride were distilled off at reduced pressure to afford maleinized polybutadiene ($B_1'$) having an acid number of 80 and a viscosity at 25° C of 1200 poises.

A 2-liter separatle flask equipped with a reflux condenser was charged with 100 g of the maleinized polybutadiene ($B_1'$), 11.0 g of dimethylaminopropylamine, 2.2 g of monoethanolamine and 50 g of xylene, and the mixture was heated at 130° C for 5 hours. The xylene and unreacted amine were distilled off at reduced pressuee to afford polybutadiene containing a tertiary amino group and a hydroxyl group. The polybutadiene obtained was dissolved in an aqueous solution of acetic acid to form a 20% aqueous solution of the polybutadiene. 63.1 g of the pigment paste (A) was added to the aqueous solution, and after thorough mixing, pure water was added to form an electrodeposition coating solution having a solids concentration of 12%.

The electrodeposition coating solution was placed in a 1-liter beaker, and coated on a mild steel plate (treated with Bondelite #3114, a trademark for a product of Nippon Test Panel Co., Ltd.) as a cathode using a carbon electrode plate as an anode. The results are shown in Table 4. It is seen from Table 4 that the same superior results as in Example 10 were obtained.

Table 4

| | |
|---|---|
| Coating conditions | |
| Voltage (V) | 70 |
| Time (minutes) | 3 |
| Baking conditions | |
| Temperature (° C) | 190 |
| Time (minutes) | 30 |
| Coating thickness (microns) | 20 |
| Physical tests | |
| Pencil hardness | H - 2H |
| Sketching | Good |
| Crosscut test (tape test) | 100/100 |
| Erichsen (mm) | >9 |
| Impact strength (cm) | |
| Top surface | >50 |
| Back surface | >50 |

Table 4-continued

| | |
|---|---|
| Flexural resistance (mm) | <2 |
| Chemical tests | |
| Alkali resistance (hours) | >100 |
| Acid resistance (hours) | 60 |
| Solvent resistance (days) | >30 |
| Water resistance (days) | >30 |
| Corrosion resistance (mm) | 1 |

*The corrosion resistance was measured in the same way as in the other Examples except that the time required for salt spray was changed to 400 hours.

What we claim is:

1. A coating composition for cathode-precipitating electrodeposition consisting essentially of
   (1) a curable resinous film-forming component capable of being rendered water-soluble, said component consisting of an unsaturated organic compound having a molecular weight of 300 to 30,000 containing a carbon-carbon double bond in an amount corrresponding to an iodine number of 50 to 500, said unsaturated organic compound being selected from the group consisting of (a) a homopolymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, organic basic groups of the following formula in aqueous solutions when rendered water-soluble

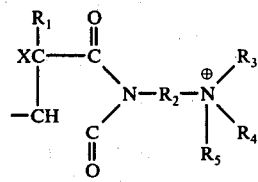

wherein $R_1$ is hydrogen, halogen or a hydrocarbon residue containing 1 to 3 carbon atoms, $R_2$, $R_3$ and $R_4$ are identical or different and each represents a hydrocarbon residue containing 1 to 20 carbon atoms, $R_5$ is hydrogen, and X represents hydrogen or a bond, the amount of said organic basic groups being 0.05 to 0.5 mole per 100 g of the film-forming component, and (2) an aqueous or organic liquid medium, said film-forming component being rendered water-soluble by neutralization with a water-soluble inorganic or organic acid.

2. The composition of claim 1 wherein said organic basic groups have been rendered water-soluble.

3. The composition of claim 1 wherein said unsaturated organic compound is an oil selected from the group consisting of linseed oil, tung oil, soybean oil, dehydrated castor oil and a stand oil.

4. The composition of claim 1 wherein the unsaturated organic compound contains, in addition to the organic basic groups, hydroxyl containing groups represented by the formula

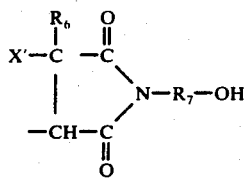

wherein $R_6$ is hydrogen, halogen or a hydrocarbon residue containing 1 to 3 carbon atoms, $R_7$ is a hydrocarbon residue containing 1 to 20 carbon atoms, and $X'$ represents hydrogen or a bond, in an amount of up to 0.2 mole per 100 g of the film-forming component.

5. A process for producing the composition of claim 1, which comprises reacting
(A) an unsaturated organic compound having a molecular weight of 300 to 30,000 containing a carbon-carbon double bond in an amount corresponding to an iodine number of 50 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having an ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, acidic groups of the formula

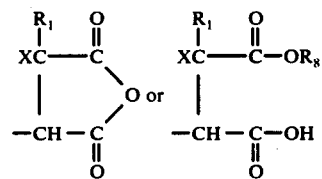

wherein $R_1$ is hydrogen, halogen or a hydrocarbon residue containing 1 to 3 carbon atoms, $R_8$ is hydrogen or a hydrocarbon residue containing 1 to 20 carbon atoms, and X represents hydrogen or a bond, with
(B) a diamine compound of the formula

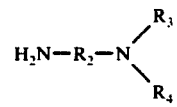

wherein $R_2$, $R_3$ and $R_4$ are identical or different and each represents a hydrocarbon residue containing 1 to 20 carbon atoms, at a temperature of 100° to 200° C. to form a resinous substance containing basic groups, adding a water-soluble inorganic or organic acid to the resinous substance to render the resinous substance water-soluble, and mixing the resulting water-soluble resinous substance with an aqueous or organic liquid medium; or performing the above reaction in the presence of the liquid medium.

6. The process of claim 5 wherein said diamine compound is selected from the group consisting of dimethylaminoethylamine, diethylaminoethylamine, dimethylaminopropylamine, diethylaminopropylamine and dibutylaminopropylamine.

7. The process of claim 1 wherein said alcoholamine compound is selected from the group consisting of monomethanolamine, monoethanolamine, monopropanolamine monobutanolamine.

8. The process of claim 5 wherein the unsaturated organic compound component (A) is reacted with the diamine compound component (B) and an alcohol amine compound component (C) represented by the formula $$H_2N - R_7 - OH$$

wherein $R_7$ is a hydrocarbon residue containing 1 to 20 carbon atoms.

9. The process of claim 5 wherein said component (A) is selected from the group consisting of maleinized linseed oil, maleinized liquid polybutadiene and maleinized petroleum resin.

* * * * *

UNITED STATES PATENT AND TRADEMARK OFFICE
CERTIFICATE OF CORRECTION

PATENT NO. : 4,072,536
DATED : February 7, 1978
INVENTOR(S) : Yutaka Otsuki, Yoshihiko Araki and Kazuho Aoyama It is certified that error appears in the above-identified patent and that said Letters Patent are hereby corrected as shown below:

In claim 1, change the structural formula at column 18, lines 40-45 to read as

-- 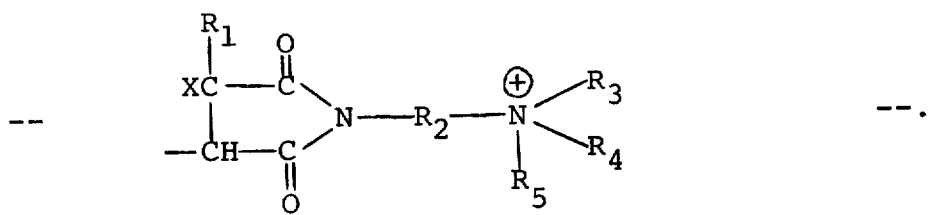 --.

Signed and Sealed this

Twenty-fourth Day of October 1978

[SEAL]

Attest:

RUTH C. MASON
Attesting Officer

DONALD W. BANNER
Commissioner of Patents and Trademarks